United States Patent
Pitta Eswara Chandra et al.

(10) Patent No.: US 10,362,168 B1
(45) Date of Patent: Jul. 23, 2019

(54) CALL MANAGEMENT SYSTEM FOR A COMMAND CENTER

(71) Applicant: MOTOROLA SOLUTIONS, INC., Chicago, IL (US)

(72) Inventors: Vidya Sagar Pitta Eswara Chandra, Arlington Heights, IL (US); Brian J. Frommelt, Deer Park, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/110,494

(22) Filed: Aug. 23, 2018

(51) Int. Cl.
*H04M 3/51* (2006.01)
*H04M 3/523* (2006.01)

(52) U.S. Cl.
CPC ....... *H04M 3/5116* (2013.01); *H04M 3/5166* (2013.01); *H04M 3/5183* (2013.01); *H04M 3/5235* (2013.01)

(58) Field of Classification Search
USPC ........................................................ 379/37
See application file for complete search history.

(56) References Cited

U.S. PATENT DOCUMENTS

| | | | |
|---|---|---|---|
| 6,118,866 A | 9/2000 | Shtivelman | |
| 6,370,234 B1 | 4/2002 | Kroll | |
| 7,065,203 B1* | 6/2006 | Huart | H04Q 3/0062 379/221.07 |
| 8,838,061 B2 | 9/2014 | Keller et al. | |
| 8,976,939 B1* | 3/2015 | Hamilton | H04M 3/5116 379/45 |
| 9,072,016 B1* | 6/2015 | Abou-El-Ella | H04W 28/24 |
| 2002/0054587 A1* | 5/2002 | Baker | G06F 11/0709 370/352 |
| 2002/0106059 A1* | 8/2002 | Kroll | H04M 11/04 379/45 |
| 2008/0310398 A1* | 12/2008 | Jain | G10L 25/78 370/352 |
| 2010/0246781 A1* | 9/2010 | Bradburn | H04M 3/5116 379/45 |
| 2013/0337789 A1* | 12/2013 | Johnson | H04W 4/02 455/414.1 |
| 2015/0085858 A1* | 3/2015 | Kamboh | H04L 45/3065 370/353 |
| 2016/0352808 A1* | 12/2016 | Mafera | H04W 4/90 |
| 2017/0006449 A1* | 1/2017 | Igumnov | H04W 4/029 |
| 2017/0265045 A1* | 9/2017 | Igumnov | H04W 4/90 |
| 2019/0068784 A1* | 2/2019 | Reddy | H04M 3/5116 |

* cited by examiner

*Primary Examiner* — Maria El-Zoobi
(74) *Attorney, Agent, or Firm* — Michael Best & Friedrich LLP (57) ABSTRACT

Methods and systems for call queue improvement. One system includes an electronic computing device configured to receive a call from a communication device operated by a caller; analyze the call for an incident factor; and direct the call, based on the incident factor, to either an automated call handler or to an active call queue. The electronic computing device is further configured to assign an existing incident identifier associated with the existing incident to a call record of the call based on determining whether the call is in regard to an existing incident. The electronic computing device is further configured to assign the call record to an abandoned call queue, and display, via a workstation of a call taker, a list of calls included in the abandoned call queue. The list includes the call and an indication whether the existing incident identifier has been assigned to the call record.

18 Claims, 6 Drawing Sheets

CALL MANAGEMENT SYSTEM FOR A COMMAND CENTER

BACKGROUND OF THE INVENTION

Law enforcement and other public safety personnel respond to incidents in the course of their duties. Responding to incidents often involves collecting a myriad of pieces of information (for example, police reports, evidence, witness reports, video and other media assets, and the like) related to the incident response from numerous callers. During the occurrence of one or more incidents, the number of calls received at a dispatch command center may increase. Emergency call takers and incident-handling dispatchers may not be able to handle the calls efficiently by themselves.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptop computers, desktop computers, telephones (for example, cellular, land-line, or satellite), devices with an interactive display, and other communication devices may be a part of a console (sometimes referred to herein as a workstation) operated by an emergency call taker or incident handling dispatcher (herein referred to as a call taker). In some embodiments, the console of a call taker presents one or more received data feeds to the call taker via an output device. For example, content of a voice call is presented audibly via a speaker of the console. In this and other ways, the console allows the call taker to participate in voice calls with a citizen or public safety officer.

In some situations, a call from a citizen or officer is abandoned before a call taker is able to assist the caller. For example, when all call takers at a command center are currently participating in voice calls with other callers and additional calls are received by the command center, the additional calls may be placed in a queue to be handled by the next available call taker. However, a caller whose call has been placed in the queue may abandon the call by terminating the call before a call taker becomes available. An abandoned call may happen for a variety of reasons ranging from accidental dials to a worsening situation for the caller (for example, circumstances that cause a caller to end the call and take shelter). The quantity of calls received at a command center may increase when there is a significant incident. In some embodiments, the incident is an event, occurrence, or situation in which officers are involved. For example, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like). Significant incidents may cause numerous people to call a command center for the same reason. Due to the high quantity of calls received by the command center, call takers at the command center may be unable to handle all of the calls received and some pending (in other words, ringing or active) calls may be placed in a call queue to be handled later as mentioned above. This situation increases call answer waiting times for callers attempting to reach a call taker at the command center and may cause some callers to hang-up and call back repeatedly. This behavior by callers further increases the call answer waiting times for received calls as command centers may be required to respond to abandoned calls in order to verify that the caller is not in need of assistance. If the caller cannot be reached, the call taker may be required to send public safety officers to the location of the call. Call takers may not be able to determine the reason that ringing and abandoned calls were made (in other words, the reason why a caller is calling the command center) or the reason why an abandoned call was abandoned (in other words, the reason why a caller terminated the call before communicating with a call taker). Additionally, call takers may not be able to determine which ringing and abandoned calls are urgent and which are not. Thus, there is a technological problem with respect to communication between a command center and people reporting incident information to call takers at the command center. Accordingly, there is a need for a system that reduces call answer waiting times and determines reasons that ringing and abandoned calls were made and reasons that abandoned calls were abandoned before call takers receive or handle such calls.

Disclosed are, among other things, a method, device, and system for one or more electronic processors to handle calls between a communication device of a call taker (for example, a dispatch console) and a plurality of communication devices of callers (for example, smart telephones, tablets, portable radios, and the like). The system may be configured to prioritize a queue for ringing calls by identifying a call which may be in regard to an existing incident known to the command center. After receiving several calls, a call taker may have developed a full description of an incident. Additional calls may provide only redundant information and as a consequence, are not necessary to handle or are less urgent to handle. Certain embodiments described herein reduce the number of such calls by dynamically creating an automated message for calls that are likely to provide duplicate information. The automated message includes a question regarding whether the caller is calling in regard to an existing, known incident and the information needed for the caller to make an appropriate decision to stay in the queue or abandon the call (in other words, hang up). Certain embodiments described herein also aid a call taker in handling pending (in other words, ringing or active) calls and abandoned calls by automatically prioritizing them (for example, in separate queues such as a ringing/active call queue and an abandoned call queue) based on information regarding the call (for example, location information corresponding to a location from which the call was received).

Examples disclosed herein are described in terms of public safety and emergency personnel. However, it should be understood that the systems, methods, and devices described herein are not limited to the public safety environment and may be applied to other types of communication centers, for example, a customer service center.

One embodiment provides a system for call queue improvement. The system includes an electronic computing device including an electronic processor configured to receive a call from a communication device operated by a caller. The electronic processor is further configured to analyze the call for an incident factor. The incident factor is indicative of an existing incident and includes at least one selected from the group consisting of a location of a source of the call relative to the existing incident and a time after the existing incident was first reported. The electronic processor is further configured to direct the call, based on the incident factor, to either an automated call handler or to an active call queue. When the call is directed to the automated call handler, the electronic processor is further configured to (i) respond to the call with an automated message regarding the existing incident that is output via the communication device operated by the caller; (ii) receive, in response to the automated message, an answer from the caller; and (iii) determine whether the call is in regard to the existing incident based on the answer from the caller. When the call is not in regard to the existing incident, the electronic processor is further configured to assign a new incident identifier to a call record of the call and assign the call to the active call queue. When the call is in regard to the existing incident, the electronic processor is further configured to assign an existing incident identifier associated with the existing incident to the call record of the call and assign the call to the active queue. The electronic processor is further configured to determine whether the call has been abandoned. When the call has been abandoned, the electronic processor is further configured to assign the call record to an abandoned call queue, and display, via a workstation of a call taker, a first list of one or more calls included in the abandoned call queue. The first list includes the call and an indication whether the existing incident identifier has been assigned to the call record. When the call has not been abandoned, the electronic processor is further configured to display, via the workstation, a second list of one or more calls included in the active call queue. The second list includes the call and the indication whether the existing incident identifier has been assigned to the call record.

Another embodiment provides a method for call queue improvement. The method includes receiving, with an electronic processor of an electronic computing device, a call from a communication device operated by a caller. The method further includes analyzing, with the electronic processor, the call for an incident factor. The incident factor is indicative of an existing incident and includes at least one selected from the group consisting of a location of a source of the call relative to the existing incident and a time after the existing incident was first reported. The method further includes directing, with the electronic processor, the call to an automated call handler based on the incident factor. The method further includes responding, with the electronic processor, to the call with an automated message regarding the existing incident based on the incident factor. The automated message is output via the communication device operated by the caller. The method further includes receiving, with the electronic processor, an answer from the caller in response to the automated message. The method further includes determining, with the electronic processor, that the call is in regard to the existing incident based on the answer from the caller. The method further includes assigning, with the electronic processor, an existing incident identifier associated with the existing incident to a call record of the call in response to determining that the call is in regard to the existing incident. The method further includes determining, with the electronic processor, that the call has been abandoned. The method further includes assigning the call record to an abandoned call queue in response to determining that the call has been abandoned. The method further includes displaying, via a workstation of a call taker, a list of one or more calls included in the abandoned call queue. The list includes the call and an indication that the existing incident identifier has been assigned to the call record.

Figure 1:
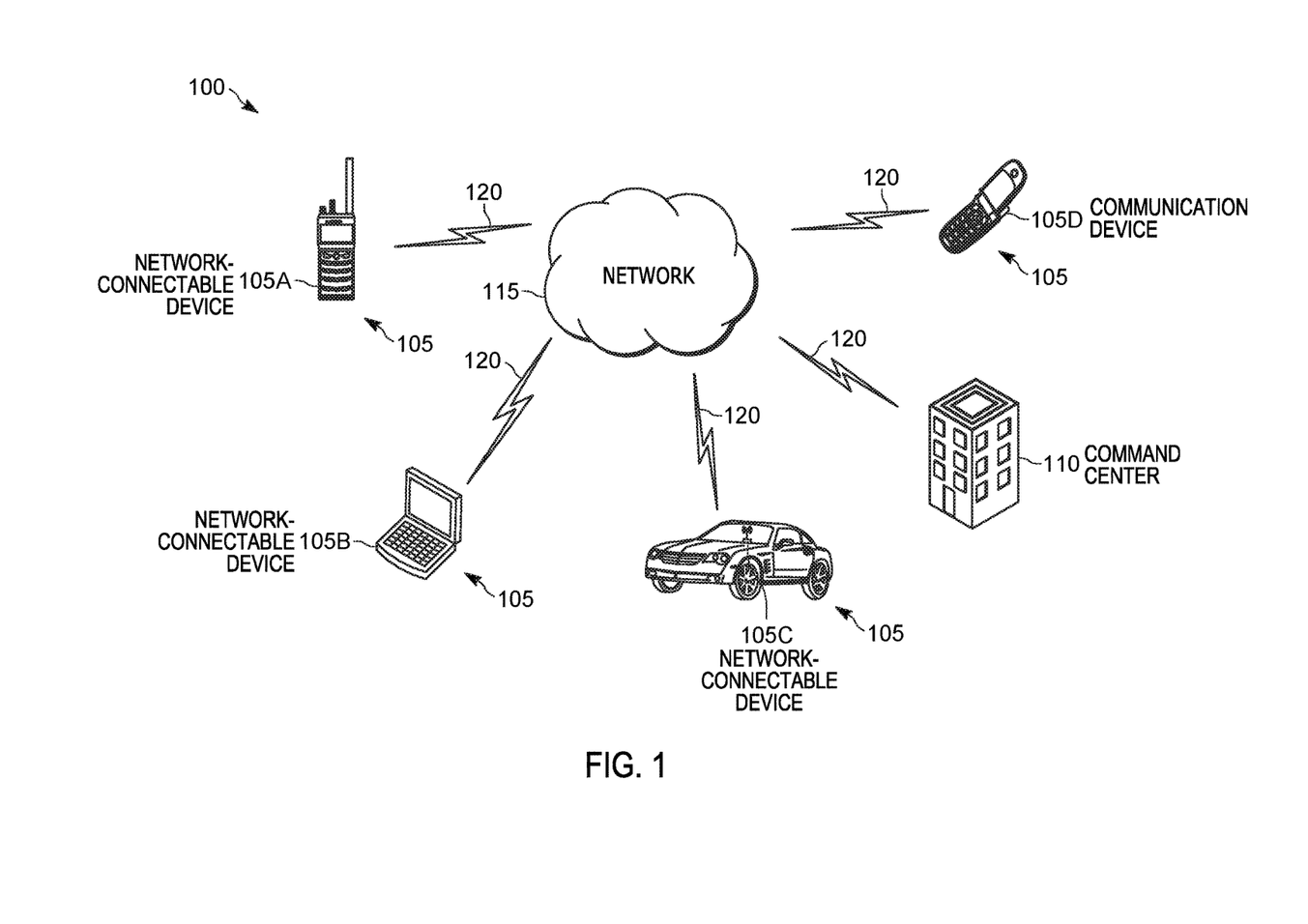
FIG. 1 is a block diagram of a communication system according to one example embodiment.

FIG. 1 is a block diagram of a communication system 100 according to one example embodiment. The communication system 100 includes various communication devices 105A through 105D communicatively coupled to a command center 110 via a network 115. In the following description, when explaining how a single communication device functions, a reference to communication device 105 is used. As indicated by FIG. 1, the communication device 105 may be any one of a number of different types of communication devices. For example, the communication device 105 may be one or more of a smart telephone, a portable radio, a desktop or laptop computer, a tablet, a body wearable camera, or similar device. The communication device 105 may be configured to receive input from a user, for example, via a keyboard, a touchscreen display, a microphone (for example, voice commands), and the like. The types of communication devices 105A through 105D described above and shown in FIG. 1 are merely examples. In other embodiments, the communication system 100 includes other types of communication devices. In some embodiments, the communication system 100 includes more or fewer communication devices 105 than the number of communication devices 105 shown in FIG. 1.

As shown in FIG. 1, the communication system 100 also includes a command center 110. For example, the command center 110 is a security management office at a theme park or a public safety command center such as a police headquarters, fire station, dispatch center, public safety answering point (PSAP), operations center, command and control facility, and the like. The command center 110 includes a monitoring computer 205 and one or more workstations 210 that are part of the communication system 100 as explained below with respect to FIG. 2. In the following description, when explaining communication to or from the command center 110, it should be understood that such communication is occurring to or from one or more of the monitoring computer 205 and the workstations 210 included in the command center 110.

As indicated in FIG. 1, the communication devices 105A through 105D and the command center 110 may communicate with each other over a network 115 over respective wireless links 120 and via corresponding network interfaces including, for example, one or more transceiver circuits. The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Figure 2:
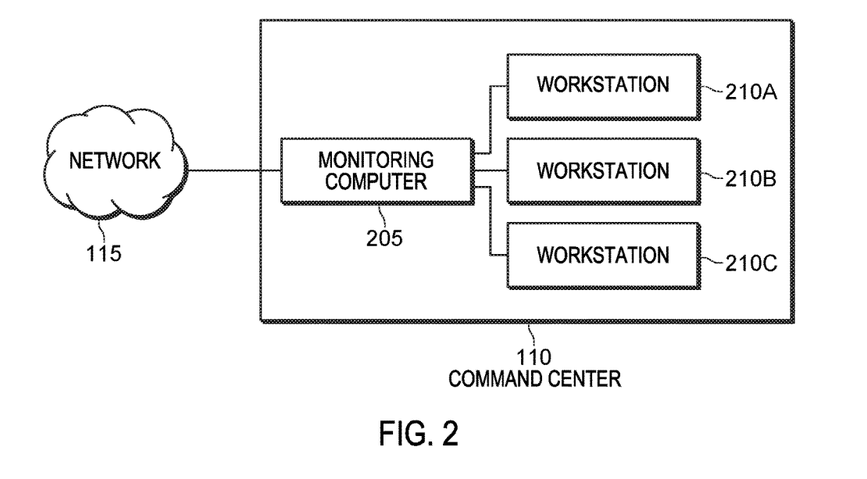
FIG. 2 is a block diagram of a command center included in the communication system of FIG. 1 according to one example embodiment.

FIG. 2 is a block diagram of the command center 110 according to one example embodiment. The command center 110 includes a monitoring computer 205 and a plurality of call handling workstations 210A through 210C. In the following description, when explaining how a single workstation functions, a reference to workstation 210 is used. The workstations 210 are consoles that are each operated by a separate call taker (for example, public safety dispatch consoles each operated by a separate public safety call taker). In some situations, the call takers include emergency call-takers and incident-handling dispatchers. In some embodiments, an emergency call-taker is a person who analyzes a received data feed (for example, voice call, live or recorded video feed, text message, and the like), identifies an incident based on the data feed, and decides how to respond to the data feed to help the citizen and handle the incident. For example, the emergency call-taker may transfer the data feed to a different agency (for example, animal control), take no action (for example, when the data feed is a prank call or an accidental call), transfer the data feed to the console of another call-taker (for example, the incident-handling dispatcher), and the like. A console may receive one or more data feeds from multiple sources including, for example, communication devices 105 operated by citizens. In addition, a console of an incident-handling dispatcher may receive one or more data feeds in response to an emergency call-taker transferring the one or more data feeds from a console of the emergency call-taker to the incident-handling dispatcher console. The incident-handling dispatcher may be temporarily assigned to an incident in which officers are supervising, maintaining, providing assistance, and the like (for example, a concert, a sporting event, management of a theme park or other entertainment venue, and the like). In some embodiments, the monitoring computer 205 is communicatively coupled to the network 115 and to the workstations 210A through 210C via wired connections, wireless connections, or a combination thereof.

As explained in greater detail below, the monitoring computer 205 is configured to receive one or more data feeds (for example, voice calls) from one or more communication devices 105 over the network 115. In some embodiments, the monitoring computer 205 is configured to control which received data feeds are provided to which workstations 210. Likewise, the workstations 210 are configured to communicate through the monitoring computer 205 to one or more communication devices 105 over the network 115. For ease of description, data feeds received at the monitoring computer 205 that are then directed to the one or more workstations 210 are herein referred to as "calls." It should be understood that, while the calls are described as being audio feeds (voice calls) in the examples described herein, calls may be or include other types of data feeds as described above (for example, audio/video calls and the like).

The monitoring computer 205, described more particularly below with respect to FIG. 3, may be implemented as a stand-alone device (for example, a server) or distributed across one or more electronic processing devices (for example the workstations 210A through 210C). In some embodiments, the monitoring computer 205 may be implemented as a cloud-based server/application (for example, operating on one or more virtual servers).

The workstation 210 is used by a call taker (for example, a public safety dispatch console used by an incident-handling dispatcher as explained above). The workstation 210 is configured to send and receive data to and from the monitoring computer 205 (via the communications network 115). As indicated by FIG. 1, the workstation 210 may be configured to communicate with one or more communication devices 105. The workstation 210 may receive captured images, video, audio such as voice calls, and other data related to incidents. The workstation 210 is configured to transmit and/or receive such data through the monitoring computer 205 or directly over the communication network 115. Although the workstations 210 are described as being located at the command center 110, in some embodiments, one or more of the workstations 210 are located/dispersed outside the command center 110, for example, when one or more of the workstations 210 are located at a different command center and/or are portable devices such as the communication devices 105 described above.

While FIG. 2 shows the workstations 210 and the monitoring computer 205 as separate devices, in some embodiments, the workstations 210 are integrated into the monitoring computer 205 and directly controlled by the monitoring computer 205. In other embodiments, the command center 110 may not include a separate monitoring computer 205 and the functionality of the monitoring computer 205 described below may be integrated into each of the workstations 210. In some embodiments, the monitoring computer 205 includes more or fewer workstations 210 than the number of workstations 210 shown in FIG. 2.

As mentioned above, the monitoring computer 205 receives and allocates calls received from one or more communication devices 105 to one or more of the workstations 210. In some embodiments, for each call received at the monitoring computer 205, a call record is created. Each call record includes information regarding the call, for example, a telephone number that the call is from, a timestamp of when the call was first received, a caller identification, a location that the call is from, a location of a cell tower that was used to transmit the call, and the like. Information included in the call record may be obtained by analyzing the one or more data feeds and/or metadata included in the call. The analysis may be performed while the call is in a queue and/or when the call is being handled by a call handler. For example, a call includes metadata that indicates a location from where the call was received, a timestamp including a time at which the call was captured or transmitted, an identifier that identifies a user of the communication device 105 that transmitted the data feed, and the like. As another example, when the call is or includes a text feed (for example, a text message), the monitoring computer 205 analyzes the data feed. As another example, and as explained below, the monitoring computer 205 may receive information through an automated questionnaire provided (described below as part of an automated call handling process/handler) to the communication device 105 providing a data feed (for example, a voice call). In response to the automated questionnaire, the monitoring computer 205 receives information about the data feed from a user of the communication device 105 providing the data feed. In some embodiments, the monitoring computer 205 determines additional information from the received information from the user of the communication device 105 as explained in greater detail below (for example, incident type information based on keyword data). Further information may be added to the call record via user input through the workstation 210 by a call taker handling the call.

As explained in more detail below, the call record may be associated with an incident record. The incident record includes information and details regarding a new incident or an incident handled or that is being handled by officers. The information in the incident record may include, for example, an incident type, a location of the incident, a timeline of the incident, and the like. The incident record includes a unique incident record identifier. The identifier is a unique label that discerns a particular incident record from other records (for example, an incident number that discerns a fire at 123 Main Street from a vehicle accident at 456 First Street).

The monitoring computer 205 also maintains a queue of pending/ringing/active calls received from communication devices 105 that are intended for the command center 110 (referred to herein as a waiting call queue) before allocating them to a queue for one or more of the workstations 210. The received calls, when still active (in other words, calls where the caller has not hung up), are directed to an active call queue of the one or more workstations 210 while calls that have been abandoned (in other words, calls where the caller has hung up), are directed to an abandoned call queue of the one or more workstations 210. When all call takers are currently handling other calls (for example, voice calls), the monitoring computer 205 queues later-received calls in the appropriate queue in the order that they are received. When a call taker becomes available, the monitoring computer 205 routes a call in the active call queue to the newly-available call taker. As described in more detail below, the monitoring computer 205 may assign a queued call to an active call queue when the operator of the communication device 105 is waiting on the line to communicate with a call taker. The active call queue may be a collective queue for the workstations 210 of the command center 110, wherein the queued call at the top of the queue (the oldest in the queue) is directed to the first available workstation 210 or the active call queue may be a queue of a particular workstation 210 (for example, a workstation assigned to handle a particular incident). Similarly, the monitoring computer 205 and/or the workstations 210 may each maintain an abandoned call queue. The abandoned call queue includes one or more records of calls that ended before being handled by a call taker (for example, calls that were terminated while being handled by a dispatcher or while in the active call queue). In some embodiments, the monitoring computer 205 may direct later received calls to the active call queue or the abandoned call queue of a workstation 210 that is currently handling a call. The call taker operating the particular workstation 210 may then choose to answer or handle calls in one of the queues after completing the current call.

Figure 3:
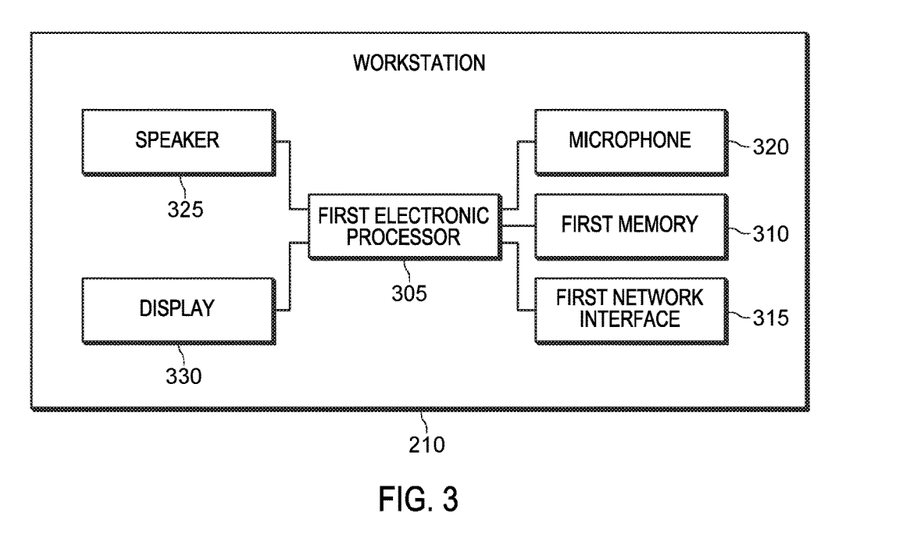
FIG. 3 is a block diagram of a workstation included in the command center of FIG. 2 according to one example embodiment.

FIG. 3 is a block diagram of a workstation 210 according to one example embodiment. In the embodiment illustrated, the workstation 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the workstation 210 includes fewer or additional components in configurations different from that illustrated in FIG. 3. For example, the workstation 210 may additionally include a push-to-talk button or a camera. As another example, the workstation 210 may include one or more additional input devices such as a computer mouse and/or a keyboard that receive inputs from a user of the workstation 210. In some embodiments, the workstation 210 performs functionality other than the functionality described below.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein. In some embodiments, the first memory 310 is implemented on devices located at the command center 110, at a remote location, or at a remote cloud-computing cluster.

The first network interface 315 sends and receives data to and from the monitoring computer 205. In some embodiments, the first network interface 315 additionally or alternatively sends and receives data to and from the network 115 without the data first passing through a separate monitoring computer 205. In some embodiments, the first network interface 315 includes one or more transceivers for wirelessly communicating with the monitoring computer 205 and/or the network 115. Alternatively or in addition, the first network interface 315 may include a connector or port for receiving a wired connection to the monitoring computer 205 and/or the network 115, such as an Ethernet cable. The first electronic processor 305 may receive one or more data feeds (for example, a video feed, an audio feed, an image feed, a text feed, a sensor input data feed, and the like) over the network 115 through the first network interface 315 (for example, data feeds generated by one or more communication devices 105 and transmitted over the network 115). In some embodiments, the first electronic processor 305 receives data through the first network interface 315 directly from a communication device 105. In some embodiments, communication of data feeds may occur in approximately real-time. The first electronic processor 305 may communicate data generated by the workstation 210 over the network 115 through the first network interface 315, such as for receipt by one or more communication devices 105. For example, the first electronic processor 305 receives electrical signals representing sound from the microphone 320 and may communicate information relating to the electrical signals over the network 115 through the first network interface 315 to other devices, for example, to one or more communication devices 105. Similarly, the first electronic processor 305 may output the one or more data feeds received from the network 115 through the first network interface 315, for example from a communication device 105, through the speaker 325, the display 330, or a combination thereof. For example, the workstation 210 engages in a voice call with a communication device 105 over the network 115.

The display 330 displays images, video, text, and/or data from sensor inputs to the user (for example, an incident-handling dispatcher). The display 330 may be a liquid crystal display (LCD) screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the workstation 210 (for example, an incident-handling dispatcher). In some embodiments, the microphone 320, a computer mouse, and/or a keyboard or a touch-sensitive display are referred to as input devices that receive input from a user of the workstation 210.

In some embodiments, the communication devices 105 include similar components as those shown in FIG. 3 with respect to the workstation 210. In some embodiments, the communication devices 105 include fewer or additional components in configurations different from that illustrated in FIG. 3. For example, a communication device 105 may also include one or more of a push-to-talk button to initiate voice communication over the network 115 (for example, an audio feed), a camera to capture a video feed and/or an image feed to be transmitted over the network 115, and a location component (for example, a global positioning system receiver) configured to determine the geographic coordinates of the location of the communication device 105. In some embodiments, the communication devices 105 transmit their respective location coordinates over the network 115 when transmitting data feeds to the command center 110 (for example, location information is stored as metadata associated with a data feed). Similarly, in some embodiments, the communication devices 105 also include a time stamp when transmitting a data feed such that the command center 110 may determine a time of capture of the data feed or a time of transmission of the data feed. In some embodiments, the communication devices 105 transmit a unique identifier of the communication device 105 over the network 115 when transmitting data feeds to the command center 110 (for example, a unique identifier is stored as metadata associated with a data feed). In some embodiments, the communication devices 105 transmit a text feed over the network 115 to the command center 110 (for example, a text message from a smart phone, portable radio, or the like that includes alphanumeric and/or numeric data).

Figure 4:
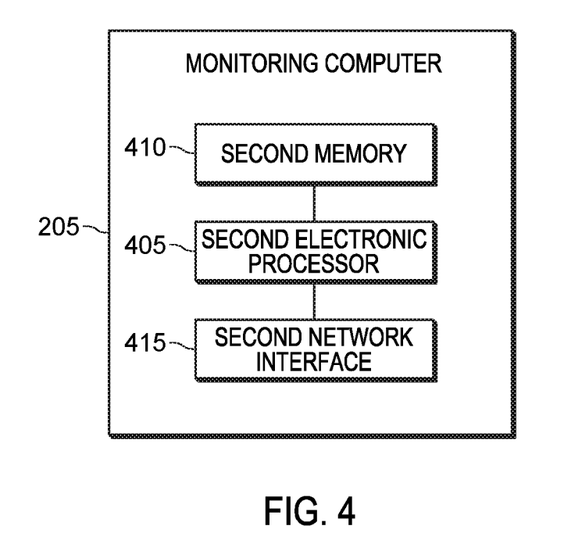
FIG. 4 is a block diagram of a monitoring computer included in the command center of FIG. 2 according to one example embodiment.

FIG. 4 is a block diagram of the monitoring computer 205 according to one example embodiment. In the example shown, the monitoring computer 205 includes a second electronic processor 405 electrically connected to a second memory 410 and a second network interface 415. These components are similar to the like-named components of the workstation 210 explained above with respect to FIG. 3 and function in a similar manner as described above. In some embodiments, the second network interface 415 sends and receives data to and from the network 115 and the workstations 210. In some embodiments, the monitoring computer 205 includes fewer or additional components in configurations different from that illustrated in FIG. 4. For example, the monitoring computer 205 may additionally include a display such as a touch screen to allow a user to reprogram settings of the methods described below. In some embodiments, the monitoring computer 205 performs functionality other than the functionality described below.

The monitoring computer 205 is configured to receive calls from communication devices 105 operated by citizens (for example, smart phones of citizens who have entered a user input to transmit one or more calls to a public safety command center 110 by, for example, dialing 9-1-1) and allocate or transmit the call(s) to one or more of the workstations 210 to be handled. In other words, the monitoring computer 205 is configured to act as a switch for calls received at the command center 110. As stated above, in some embodiments, each workstation 210 is operated by an emergency call taker (for example, a dispatcher) that may be tasked with identifying a type of incident based on the one or more received calls from a communication device 105. For example, the call taker may enter a user input into the workstation 210 to identify an incident type and/or a location of the incident (for example, with a text document/incident record) based on a received voice call (for example, an audio feed) where a citizen describes the incident. In some embodiments, the call taker decides how to respond to the call to help the citizen and handle the incident. For example, the workstation 210 may receive a user input from the call taker to transfer the call to a different agency (for example, animal control), take no action (for example, when the call is a prank call or an accidental call), transfer the call to the monitoring computer 205 to be further transferred to the workstation 210 of another call taker (for example, an incident-handling dispatcher), and the like. The workstation 210 may transfer information corresponding to the incident type and the location of the incident that was identified by the call taker to the monitoring computer 205. In some embodiments, the workstation 210 also transfers information corresponding to which workstation 210 the call should be transmitted. For example, the workstation receives a user input from the call taker to transfer the call to the workstation 210A because one or more previously-received calls associated with the same incident were routed to the workstation 210A. In this example, the workstation 210A of the same incident-handling call taker receives multiple calls relating to a single incident in which the incident-handling call taker is monitoring and handling.

In some embodiments, the workstation 210 and/or the monitoring computer 205 determines how to respond to the call to help the citizen and handle the incident in an automated manner (for example, using one or more of voice analytics, video analytics, text analytics, and the like to take a predetermined action based on the received data feed). For example, the workstation 210, the monitoring computer 205, or a combination thereof may analyze metadata of a call or use an automated questionnaire to obtain information about a call from a user of a communication device 105 as described in further detail below.

In some embodiments, the monitoring computer 205 receives calls from communication devices 105 operated by officers such as public safety officers. For example, because the public safety officers are trained to identify and handle many different public safety incidents, it may not be necessary for an emergency call-taker to identify a type of incident or how to handle the incident when the data feed is received from a communication device 105 of an officer. Rather, the communication device 105 of a public safety officer may receive a user input from the officer indicating a type of incident (for example, by the officer entering a code that represents the incident type) and other information related to the incident (for example, location, number of victims, and the like). The communication device 105 of the officer then transmits this information as well as any selected data feeds over the network 115 to the monitoring computer 205 to be transferred to a workstation 210 of the incident-handling call taker that is handling the corresponding incident.

In some embodiments, data feeds are received from communication devices 105 that include, for example, sensors and a camera, that are not operated by a citizen or an officer. For example, data feeds may be received from one or more of a security camera, a traffic camera, an alarm notification system that monitors one or more of a building, a park, a fence, a parking lot, and other geographical locations (for example, a fire alarm, a toxic gas alarm, and the like), and the like.

While FIGS. 3 and 4 show separate block diagrams of the workstation 210 and the monitoring computer 205, as noted above, in some embodiments, the workstations 210 and/or the emergency call-taking devices are integrated into the monitoring computer 205 and directly controlled by one or more electronic processors of the monitoring computer 205. In other embodiments, the functionality of the monitoring computer 205 may be integrated into each of the workstations 210 and/or the emergency call-taking devices. In some embodiments, the monitoring computer 205, the workstations 210, and/or a combination thereof are referred to as an electronic computing device that performs the functionality described below. For example, the electronic computing device may be a single electronic processor (for example, the second electronic processor 405 of the monitoring computer 205) or a plurality of electronic processors located in the monitoring computer 205. In other embodiments, the electronic computing device includes multiple electronic processors distributed across different devices. For example, the electronic computing device is implemented on one or more of the first electronic processors 305 of the workstations 210, the second electronic processor 405 of the monitoring computer 205, and one or more electronic processors located in one or more devices located at the command center 110, at a remote location, or at a remote cloud-computing cluster. In some embodiments, the electronic computing device is a communication device 105 and an electronic processor of the communication device 105 performs the functionality described below.

Due to the high quantity of calls received by the command center (for example, during a significant public safety incident), call takers at the command center may be unable to handle all of the calls received, and some pending (in other words, ringing) calls may be placed in a call queue to be handled when a call taker becomes available. This situation increases call answer waiting times for callers attempting to reach a call taker at the command center and may cause some callers to hang-up and call back repeatedly. This behavior by callers further increases the call answer waiting times for received calls as command centers may be required to respond to abandoned calls in order to verify that the caller is not in need of assistance. Call takers may not be able to determine the reason that ringing and abandoned calls were made (in other words, the reason why a caller is calling the command center) or the reason why an abandoned call was abandoned (in other words, the reason why a caller terminated the call before communicating with a call taker). Additionally, call takers may not be able to determine which ringing and abandoned calls are urgent and which are not. Thus, there is a technological problem with respect to communication between a command center and people reporting incident information to call takers at the command center. Accordingly, there is a need for a system that reduces call answer waiting times and determines reasons that ringing and abandoned calls were made and reasons that abandoned calls were abandoned before call takers receive or handle such calls.

To address this technological problem, the electronic computing device described above performs, in one instance, one or more of the methods explained below. For example, a method 500 of FIG. 5 is executed by the electronic computing device to determine an incident that a call is in regard to and direct the call to either an automated call handler or an active call queue of a dispatch call workstation 210 based on the incident.

The method 500 addresses the above-noted technological problem by improving communication between a call taker and people reporting incident information to the call taker by allocating calls based on whether they are in regard to a known incident.

The system may be configured to prioritize a queue for ringing calls by identifying a call which may be in regard to an existing incident known to the command center. After receiving several calls, a call taker may have developed a full description of an incident. Additional calls may provide only redundant information and as a consequence, are not necessary to handle or are less urgent to handle. In some embodiments, the method 500 reduces the number of such calls by dynamically creating an automated message for calls that are likely to provide duplicate information. In some embodiments, the automated message includes a question regarding whether the caller is calling in regard to an existing, known incident and the information needed for the caller to make an appropriate decision to stay in the queue or abandon the call (in other words, hang up). In some embodiments, the method 500 also aids a call taker in handling pending (in other words, ringing or active) calls and abandoned calls by automatically prioritizing them (for example, in separate queues such as an active call queue and an abandoned call queue) based on information regarding the call (for example, location information corresponding to a location from which the call was received). Automated handling of calls allows calls to be allocated to an appropriate call taker, helps identify calls that would provide redundant information, and helps identify abandoned calls that need no follow up. This reduces the size of both the active call queue and the abandoned call queue. Thus, the method 500 improves the speed and accuracy at which a command center 110 may handle calls.

Figure 5:
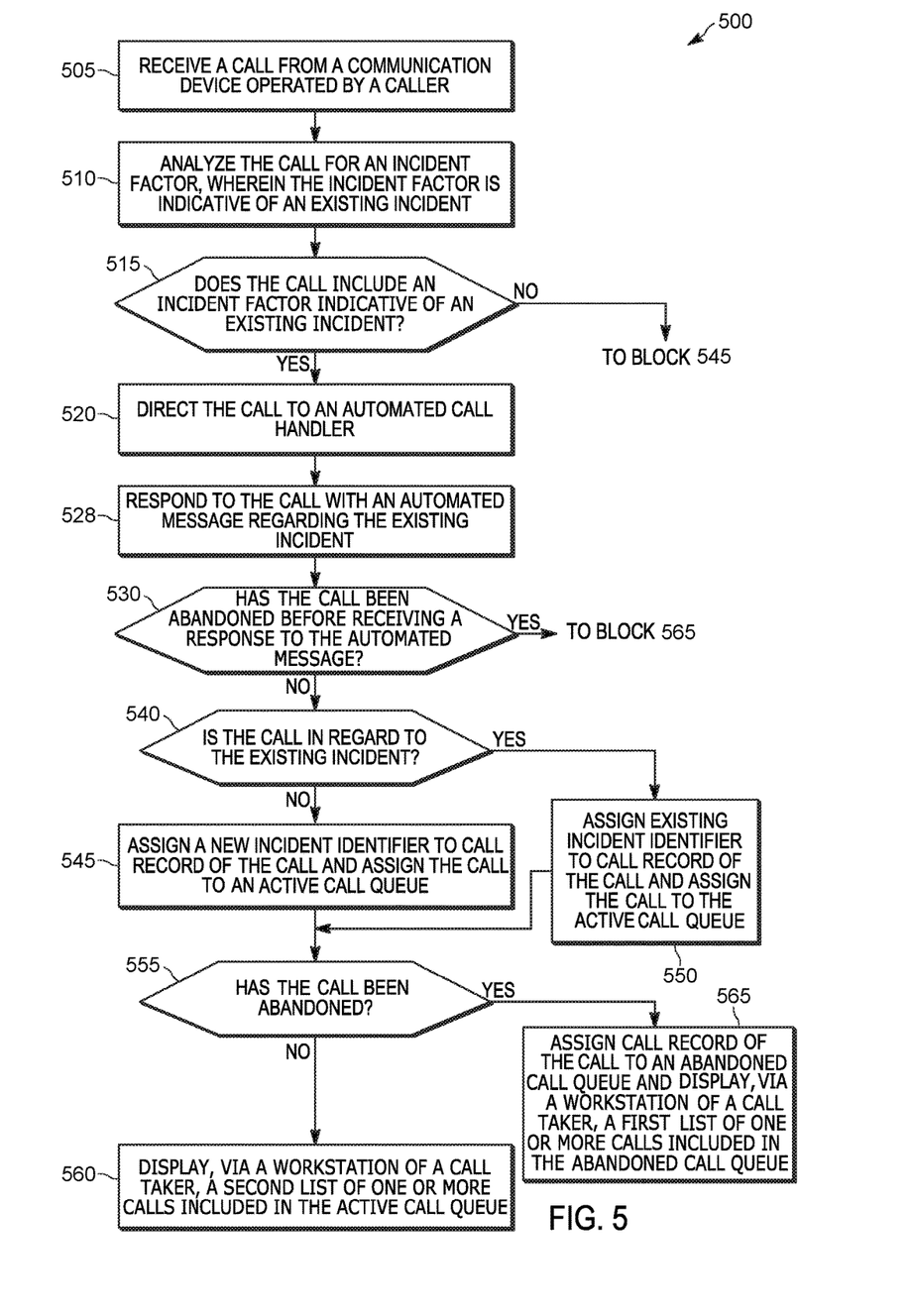
FIG. 5 is a flow chart of a method for optimizing a call queue of the command center of the communication system of FIG. 1 according to one example embodiment.

FIG. 5 illustrates a flow chart of the method 500 performed by the electronic computing device for improving one or more call queues of the command center 110. While a particular order of processing steps, message receptions, and/or message transmissions is indicated in FIG. 5 as an example, timing and ordering of such steps, receptions, and transmissions may vary where appropriate without negating the purpose and advantages of the examples provided. In some embodiments, the method 500 is executed by an electronic computing device of a command center 110 that implements any one of a number of call distribution methods for distributing incoming calls. For example, the method 500 is implemented by an electronic computing device of a command center 110 that implements automatic call distribution where the electronic computing device determines which workstation 210 of a call taker will receive the next call. As another example, the method 500 is implemented by an electronic computing device of a command center 110 that implements non-automatic call distribution/ring-all call distribution that causes the next incoming call to ring on the workstations 210 of all available call takers until the incoming call is answered by one of the call takers. In some embodiments, the method 500 is implemented by an electronic computing device of a command center 110 that implements other call distribution methods.

At block 505, the electronic computing device receives a first call from a communication device 105 (for example, from a civilian calling about an incident). The call includes one or more data feeds carried over a first communication channel from the first communication device 105. For example, the data feed includes an audio feed such as a voice call. As mentioned above, in some embodiments, the call is a video feed (for example, a video call) that includes both audio and visual data. In further embodiments, the call may include a text feed (for example, one or more text messages), and the like.

At block 510, the electronic computing device analyzes the first call for an incident factor. The incident factor is one or more keywords, identifiers, indicators, and the like within and/or associated with the call (for example, within metadata of the call) that is indicative of an existing incident. In other words, the electronic computing device uses the incident factor to determine whether the first call may be related to a known incident. The incident factor may include one or more of a location of a source of the call relative to the existing incident, a time after the existing incident was first reported, and a type of incident. In some embodiments, the electronic computing device determines one or more incident factors of the call by analyzing the metadata of the call. In some embodiments, the electronic computing device uses information included in the metadata of the call and compares the metadata to data included in one or more existing incident records to determine whether the call may be related to an existing incident. For example, a location of a call and a timestamp of the call may be similar to a known incident location and/or an area of high call volume (in other words, an area where most of the calls being received at the command center 110 in a small window of time are coming from) and a time of the known incident, suggesting that the call may be related to a known incident.

At block 515, the electronic computing device determines whether the call includes an incident factor indicative of an existing incident and directs the call to either an automated call handler (at block 520) or to an active (in other words, ringing) call queue of the electronic computing device (at block 545). In particular, when the call is determined to possibly be in regard to an existing incident (in other words, the call includes an incident factor indicative of an existing incident), the call is directed to the automated call handler. For example, when the electronic computing device determines that a location from which the call was received is within a predetermined distance threshold from a location of a known existing incident, the electronic computing device determines that the call may possibly be related to the existing incident. On the other hand, when the call does not include an incident factor indicative of an existing incident, the electronic computing device assigns the call to the active call queue and assigns a new incident record number or an unknown incident label (for instance, labeled as "unknown incident" or left blank) to a call record associated with the call (at block 545). As explained above, the active call queue may be a collective call queue shared by all of the workstations 210 of the command center 110 or a call queue of a particular workstation 210.

At block 528, the electronic computing device (in particular, the automated call handler being implemented by the electronic computing device) responds to the call with an automated message relating to the existing incident. The automated message is output via the communication device 105 operated by the caller. In some embodiments, the electronic computing device uses the automated message to confirm with the caller whether the call is in regard to the existing incident or not. For example, the automated message may be "Is the purpose of your call in regard to the fire at Street Ave.?" when an existing incident (a fire on Street Ave.) is located near the location of the source of the call (for example, within a mile radius of the existing incident, within one hundred meters existing incident, and the like) and/or when the time in which the call was received is close to the time the existing incident was first reported. The automated call handler may output such messages and communications via a user output of the communication device 105 (for example, via a speaker and/or display) and receive input and answers from the caller via a user input of the communication device 105 (for example, a microphone and/or keyboard input).

At block 530, the electronic computing device determines whether the call has been abandoned before the electronic computing device has received a response to the automated message and, if so, the electronic computing device proceeds to block 565 to assign the call record associated with the call to an abandoned call queue. The electronic computing device may store, in the call record, a new/unknown incident identifier (explained below) such that a call taker is able to determine that the call was abandoned before the reason for the call was determined.

At block 540, when the call is not abandoned before the electronic computing device has received a response to the automated message, the electronic computing device receives an answer in response to the automated message (for example, a voice answer from the caller) indicating whether the call is or is not in regard to the existing incident referred to in the automated message. When the answer indicates that the call is in regard to the existing incident, the electronic computing device assigns an existing incident identifier (for example, an incident record number of the record of the existing incident) to a call record associated with the call and assigns the call to the active call queue (block 550). On the other hand, when the answer indicates that the call is not in regard to the existing incident, the electronic computing device assigns a new incident identifier to a call record associated with the call and assigns the call to the active call queue (block 545). For example, the electronic computing device assigns a new incident record number or an unknown incident label (for instance, labeled as "unknown incident" or left blank). At block 555, the electronic computing device determines whether the call has been abandoned, and when the call is abandoned, assigns the call record to the abandoned call queue (block 565). Also at block 565, the electronic computing device displays, via a workstation 210 of a call taker, a first list of one or more calls included in the abandoned call queue (for example, see FIG. 6A). When the call has not been abandoned, at block 560, the electronic computing device displays, via a workstation 210 of a call taker, a second list of one or more calls included in the active call queue into which the call was previously assigned at block 545 or 550 (for example, see FIG. 6B). In some embodiments, the first and/or the second list includes the call and the indication whether the existing incident identifier has been assigned to the call record. In some embodiments, the indication whether the existing incident identifier has been assigned to the call record is based on a designation of the call determined by the electronic computing device as described below. For example, the designation of the call may indicate at least one of the group consisting of (i) that the call relates to a known incident, (ii) that the call relates to an unknown incident, and (iii) that the electronic processor was unable to determine whether the call relates to a known incident or an unknown incident as explained in greater detail below.

In some embodiments, after the electronic computing device executes blocks 560 and/or 565, the method 500 returns to block 505 to repeat the method 500 for additional received calls. In some embodiments, although the method 500 proceeds back to block 505 when additional calls are received, the electronic computing device may continue to determine whether the call in the active call queue has been abandoned (at block 555). When the electronic computing device determines that the call has been abandoned, the electronic computing device assigns the call record of the call to the abandoned call queue (at block 565).

Referring back to block 540 where the electronic computing device determines whether the call is related to an existing incident, in some embodiments, the electronic computing device is configured to use one or more techniques to analyze the answer from the caller and determine whether the answer indicates that the call is in regard to the existing incident. For example, the electronic computing device may be configured to perform natural language processing and/or optical character recognition to analyze audio and visual and/or text data (respectively) from the call when analyzing a response to the automated message from the caller. While the above example of the automated message with respect to the fire at Street Ave. asks the caller whether they are calling regarding a single existing incident, in some embodiments, the automated message asks about a plurality of existing incidents. For example, when multiple existing incidents are occurring within a predetermined distance of the location from which the call was received, the automated message may ask the caller to "press one if you are calling regarding the fire at Street Ave. Press two if you are calling regarding the car accident at 123 Main Street. Press three if you are calling about the robbery on 456 First Street." In some embodiments, the automated message asks the caller to briefly explain the incident about which they are calling. In such embodiments, the electronic computing device may use a natural language processing engine to recognize keywords spoken by a caller during in response to the automated message (for example, "gas leak," "fire," and the like) to determine that the call relates to a particular type of public safety incident. Based on this information gathered from the caller and the known existing incidents within a predetermined distance from the location from which the call was received, the electronic computing device may provide a more specific automated message to the caller to determine whether the call is related to an existing incident (as explained in the above automated message examples).

In some embodiments, after confirming that the call is in regard to an existing incident, the electronic computing device provides another automated message to indicate that the caller should (i) remain on the call and wait for the next available call taker if the caller believes that they have additional information regarding the existing incident or, (ii) terminate the call (in other words, hang up) if the caller believes that they have no additional information (for example, if the caller was merely calling to report the incident and make sure that the command center 110 had knowledge of the incident). When the caller remains on the call, the call remains in the active call queue. When the caller terminates the call, the electronic computing device stores a call record of the call in an abandoned call queue (at block 565). In some embodiments, the automated call handler implemented by the electronic computing device provides a message to the caller including a question that asks whether the caller would like to receive a follow up call from (a call taker of) the command center 110 (in particular, whether the caller wants to abandon the call). The response to this question may be stored in the call record associated with the call, allowing the call taker who handles the abandoned call to easily confirm whether or not the call taker needs to follow up on the abandoned call.

In some embodiments, the electronic computing device provides an automated message to the caller to indicate that their call is being placed in the active call queue (at blocks 545 and 550). In some embodiments, the automated message asks the caller whether the caller would like to leave a message (for example, a voice message) for the command center 110 rather than having their call placed in the active call queue. When the caller indicates that they would like to leave a voice message, the electronic computing device records and stores the voice message in the call record associated with the call such that a call taker who later handles the call has access to the voice message. In some embodiments, the electronic computing device is configured to analyze the content of the voice message using one or more natural language processing techniques to determine, for example, whether the incident relates to a known incident, an incident type of the incident, and/or a priority of the call as explained in greater detail below.

It should be understood that, at any block of the method 500, the caller may abandon the call. Depending on when the call is abandoned, the electronic computing device assigns a particular incident identifier to the call record associated with the call before assigning the call record in the abandoned call queue. For example, when the call is abandoned before receiving a response to the automated message (at block 530), the electronic computing device stores, in the call record associated with the call, a new/unknown incident identifier (at block 565) such that a call taker who later handles the abandoned call is able to determine that the call was abandoned before the reason for the call was determined. As another example, when the call is abandoned after receiving a response to the automated message that the call relates to an existing incident (at block 555), the electronic computing device assigns an existing incident identifier (for example, an incident record number of the record of the existing incident) to the call record associated with the call such that a call taker who later handles the abandoned call is able to determine that the call related to the existing incident.

As explained above, there are at least three states in which calls may be in when they are being handled by the electronic computing device: the waiting call state (the state in which incoming calls are placed when first received at the command center 110, for example, at the monitoring computer 205), the active/ringing/pending call state (the queue in which active/pending/ringing calls are placed), and the abandoned call state (the queue in which abandoned calls, specifically a record of the call, are placed). Either or both of the abandoned and active call queues may be a common queue shared by the workstations 210 of a plurality of call takers of the command center 110 or a personal queue for a particular workstation 210 of a call taker.

In some embodiments, the electronic computing device is configured to assign one or more of a designation and a priority to a call based on information gathered about the call during execution of the method 500. The electronic computing device may assign a designation and a priority to active calls, abandoned calls, or both. In some embodiments, the designation of a call indicates that (i) the call relates to a known incident, (ii) the call relates to an unknown incident, or (iii) the electronic computing device was unable to determine whether the call relates to a known incident or an unknown incident. In some embodiments, the designation also indicates whether the caller has left a message. In some embodiments the electronic computing device assigns a second designation that indicates whether the caller has left a message. In some embodiments, the workstation 210 displays queued calls in a manner that allows the call taker of the workstation 210 to identify the designation of each call. For example, each of three above-noted example designations may correspond to a symbol that is displayed next to each call in a list of queued calls. For example, a call that relates to a known incident may be displayed with a star symbol. Continuing this example, a call that relates to an unknown incident may be displayed with an exclamation point, and a call that the electronic computing device was unable to determine whether the call relates to a known incident or an unknown incident may be displayed with a question mark. As another example, the calls in a list of queued calls may be displayed in a color-coded manner depending on the example designations explained above.

In some embodiments, the priority of queued calls correlates to a position of the call within the particular call queue. In other words, after the call is directed to the active or abandoned call queue, the call may be placed in the queue relative to other calls in the queue depending on the priority of the call and the other calls. In some embodiments, the top call listed in the queue is the highest priority queue and will be handled by the next available call taker while the remaining calls in the queue are ordered according to priority. In some embodiments, the priority of a call is indicated by a symbol or character that is displayed next to the call in the list of queued calls. For example, an "A" indicates high priority, a "B" indicates medium priority, and a "C" indicates low priority. In some embodiments, the priority of a call is indicated in a color-coded manner when the calls are displayed in queued list of calls. In some embodiments, the electronic computing device determines the priority of calls based on information gathered about the calls during execution of the method 500. For example, the level of priority depends on at least one or more of (1) the designation of the call as explained above and (2) an incident type of the incident to which the call is related. For example, when a call is abandoned without the automatic call handler confirming the purpose of the call, the priority may be higher than when the call relates to a known incident because the electronic computing device is unable to confirm that the caller terminated the call because they did not have any additional information to provide. In another example, when the caller is on the line and the purpose of the call is confirmed to be in regard to a known incident, the priority of the call may be lower than that of a second call regarding an unknown incident. In another example, an abandoned call where the caller left a message for the call taker may have lower or higher priority (depending on the content of the message) than an abandoned call where the caller didn't leave a message. Alternatively, when the purpose of the call is unknown and the caller leaves a message, the priority may be higher than a priority of an abandoned call regarding a known incident where the caller did not leave a message. As an example of the electronic computing device determining priority of calls based on incident type, a call regarding an active shooter in a public location may have higher priority than a call regarding a noise complaint or an unknown incident even though the incident involving the active shooter is already known by the command center 110. In this example, because of the severity of the active shooter incident, call takers and other officers at the command center 110 may want to gather as much information as possible about the incident even though some calls may include duplicative information. As mentioned above, in some embodiments, the electronic computing device is configured to analyze the content of a message left by a call who later abandons the call using one or more natural language processing methods. In some embodiments, the electronic computing devices uses this content to determine the priority of the call (for example, by identifying an incident type based on keywords included in the message). In some embodiments, the electronic computing device organizes and displays each call queue on one or more workstations 210 based on the assigned priority of the calls included in the call queue (for example, by organizing a list of the call records of the queue by priority, flagging call records that exceed a particular priority threshold, and the like). A call taker may select a particular call from the priority-organized queue to handle next or, in some embodiments, the electronic computing device automatically connects the next available call taker to the highest priority call in a particular queue.

Figure 6A:
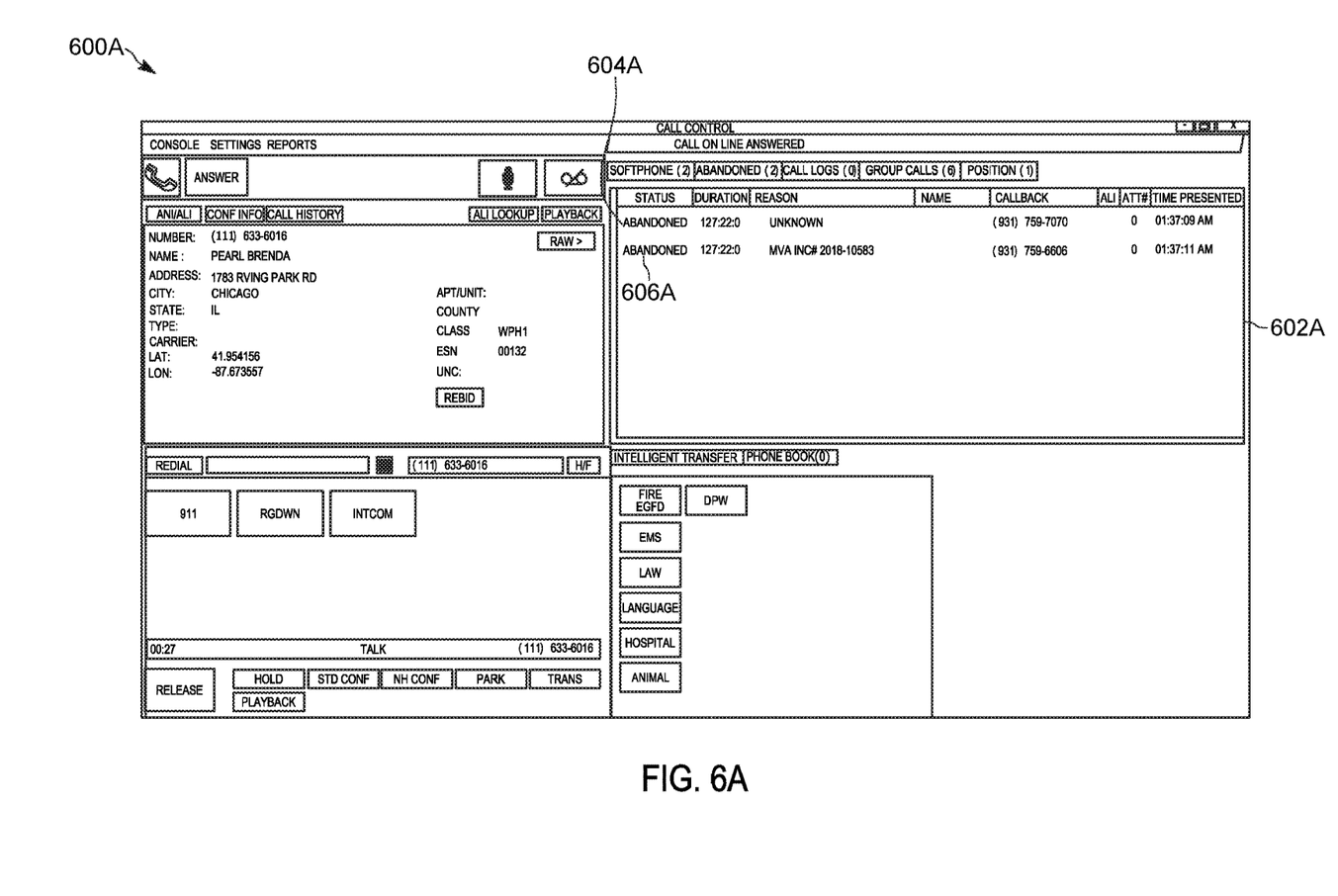
FIG. 6A is a graphical user interface of the workstation of FIG. 3 according to one example embodiment.
Figure 6B:
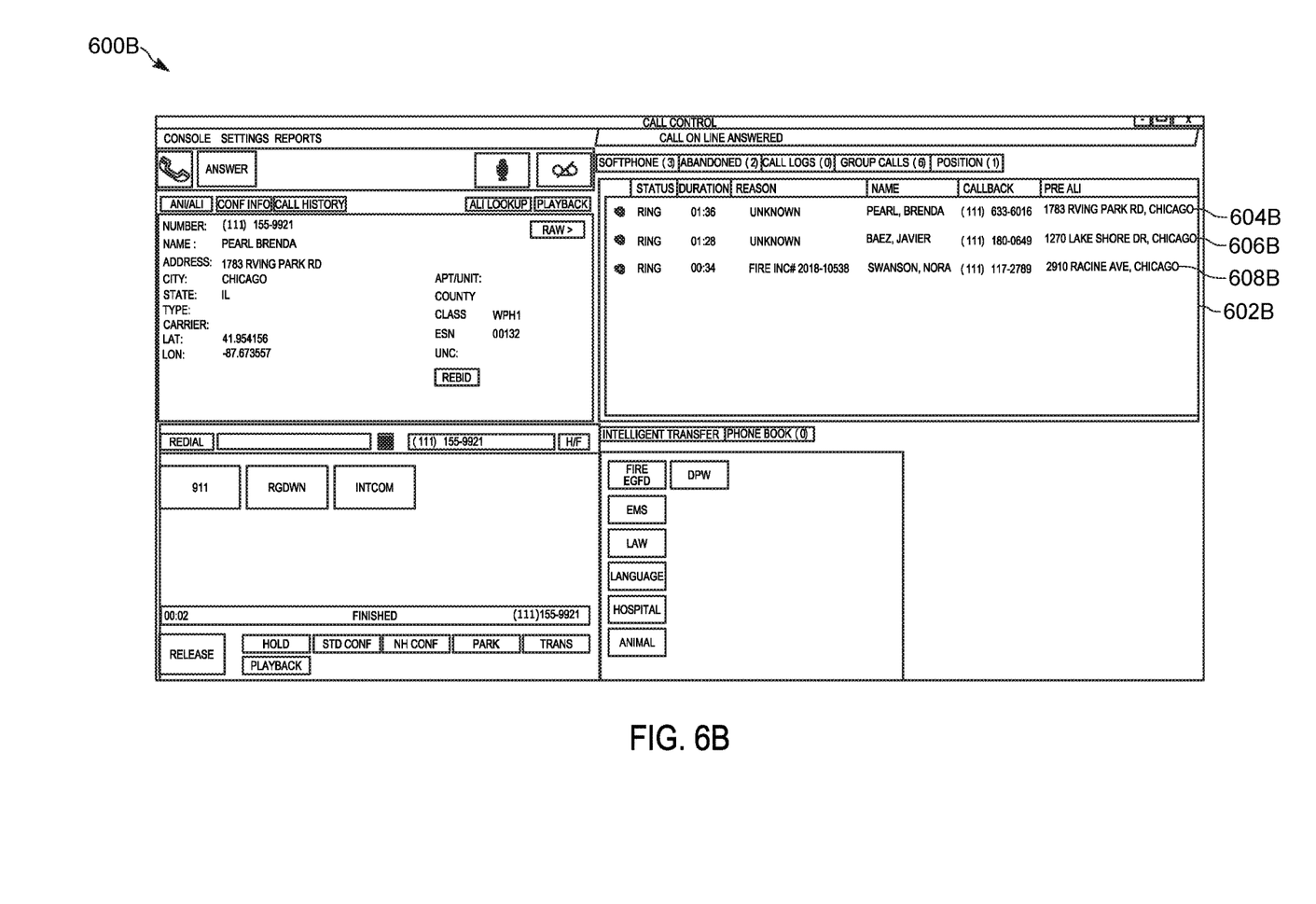
FIG. 6B is a graphical user interface of the workstation of FIG. 3 according to one example embodiment.

FIGS. 6A and 6B illustrate graphical user interfaces 600A and 600B, respectively, in accordance with some embodiments. The graphical user interfaces 600A and 600B are presented on a display of the electronic computing device (for example the display 330 of a workstation 210). The interface 600A includes an abandoned call queue window 602A. The abandoned call queue window 602A includes a list of call entries, each of which correspond to a particular call record of an abandoned call. Each entry includes information about a particular call. For example, in the abandoned call queue window 602A, the abandoned call entries 604A and 606A include a status (ABANDONED), a post call duration (how long since the call was abandoned), a reason for the call (for example, an incident that the call was in regard to), a name of the caller, a telephone number of the call, and the time the call was received. As shown in FIG. 6A, the call entry 604A has an unknown reason associated with the call, indicating that the purpose of the call was not determined before the caller abandoned the call. The call entry 606A however, includes a particular incident identifier (in the illustrated embodiment, an incident record number) meaning that the purpose of the call was determined before the caller abandoned the call. For example, the caller may have confirmed with the automated call handler that the call was in regard to a particular incident. In some embodiments, the call entries may further indicate whether a caller voluntarily abandoned the call after being prompted to do so by the automated call handler. As mentioned above, by associating abandoned calls with incident identifiers (for both known and unknown incidents), a call taker (or, in some embodiments, the electronic computing device) is able to prioritize which abandoned calls to handle first.

FIG. 6B illustrates the interface 600B in accordance with some embodiments. The interface 600B includes an active call queue window 602B. The active call queue window 602B includes a list of call entries, each of which correspond to a particular call record of an active (ringing) call. Each entry includes one or more details about a particular call. For example, in the active call queue window 602B, the active call entries 604B, 606B, and 608B include a status (RINGING), a call duration (how long the call has been pending or on hold), a reason for the call (in other words, an incident that the call was in regard to, a name of the caller, a telephone number of the call, and the time the call was received. As shown in FIG. 6B, the call entries 604B and 606B have an unknown reason associated with the call, indicating that the purpose of the call was not determined at block 515 (in other words, the call was not determined to include the incident factor). The call entry 608B however, includes a particular incident identifier (in the illustrated embodiment, an incident record number) meaning that the purpose of the call was determined at block 540 to be in regard to the existing incident and/or the purpose of the call was confirmed by the automated call handler.

As explained above, in some embodiments the electronic computing device is configured to assign the call a priority as described above (for example, based on the caller answering that they have additional information in regard to an existing incident). Based on the designations described above and whether the caller abandons the calls before talking to a call taker, a number of situations may arise that affect the priority of the call. Such instances may be, for example, (i) when the call is about a known incident and the caller stays on the call to speak with a call taker at the workstation 210, (ii) the call is about a known incident and the caller abandons the call before speaking with a call taker at the workstation 210 and does not leave a message, (iii) the call is about a known incident and the caller leaves a message for the call taker of the workstation 210 and then abandons the call, (iv) the call is about an unknown incident and the caller remains on the line to speak with a call taker of the workstation 210, (v) the call is about an unknown incident and the caller abandons the call before talking to a call taker and does not leave a message, and (vi) the call is about an unknown incident and the caller leaves a message for the call taker and then abandons the call. In some embodiments, the electronic computing devices assigns a different priority to each call depending on the example situation described above that applies to each respective call. In other words, the electronic computing device may assign a priority to abandoned calls based on a point in time during the execution of the method 500 at which the caller abandoned the call. For example, a first call abandoned after the automated message was completely presented may be assigned a lower priority than a second call that was abandoned as soon as the automated message began being presented. In this example, the first caller may be more likely to have abandoned the first call due to not having any additional information about the existing incident to report while the second caller may be more likely to have abandoned the second call out of frustration from not being able to talk to a call taker. In some embodiments, known incidents of different types may be assigned different priorities as explained above with respect to the active shooter example. As another example, a large car accident with multiple people injured may have a higher priority than a robbery where no people have been injured.

In some embodiments, the automated message is dynamically modified based on information from an incident record of the existing incident as new information is received from one or more calls regarding the incident and/or added to the corresponding incident record by a call taker. In other words, the electronic computing device may modify the automated message to include more details about the incident as new information is added to the incident record. As an example, the automated message may be modified from the above example of "Is the purpose of your call in regard to the fire at Street Ave.?", to be "Is the purpose of your call in regard to the fire at the bank on 5432 Street Ave.?" This dynamic modification allows a caller to better explain whether he or she has additional information in regard to the incident. For example, a caller may be calling in regard to a fire on 5432 Street Ave., but the fire may be a fire separate from the known fire at the bank.

In some embodiments, values and the thresholds corresponding to the determination of an incident factor within a call described above at block 510 are user configurable via an input device of the electronic computing device at the command center 110. In other words, the electronic computing device may be programmed to use one or more common data elements when determining whether the call may be related to the same public safety incident. A user may adjust particular thresholds such as the time from the occurrence of the incident (for example, calls received more than two hours after an incident may not be related) or the distance from the incident location. Similarly, a user may adjust settings related to how the electronic computing device determines priority of active calls, abandoned calls, or both. In some embodiments, a user may also adjust the manner in which prioritized calls are displayed via the workstation 210 and/or the manner in which designations of calls are displayed via the workstation 210.

In some embodiments, the electronic computing device (in particular, the automated call handler) provides additional questions to a caller such as asking about additional known incidents that the caller may be calling about as described in the above example. For example, based on the location from which the call was received (for example, known by analyzing metadata of the call), the electronic computing device transmits an automated message to be audibly output by the communication device 105. The automated message may be, for example, "there are currently two incidents near your location. Press one if you are calling regarding the robbery on 5430 Street Ave. Press two if you are calling regarding the fire on 5432 Street Ave. Press three if you are not calling about the previously-described incidents." In addition to or as an alternative to receiving responses to the automated questionnaire via user input of a caller on a keypad or touchscreen, the electronic computing device may receive oral responses from the caller and, as mentioned above, may use a natural language processing engine to determine whether the caller is calling regarding one of the known incidents.

In some embodiments, the electronic computing device is configured to provide the automated questionnaire to the communication device 105 in response to determining that at least one of the group consisting of a quantity of calls in regard to a particular incident exceeds a predetermined quantity threshold and a quantity of total calls received at the command center 110 exceeds a predetermined threshold. For example, when the quantity of active calls in regard to a particular incident being handled by call takers at the command center 110 exceeds a predetermined quantity threshold, the electronic computing device provides the automated questionnaire to one or more communication devices 105 in the queue. As another example, when a quantity of calls received by the command center 110 (for example, an overall quantity of queued calls and calls being handled by call takers) exceeds a predetermined threshold, the electronic computing device provides the automated questionnaire to one or more communication devices 105 in the queue.

As mentioned above, although most of the above-described examples refer to an audio data feed (voice call) of a communication device 105, in some embodiments, the electronic computing device receives and analyzes additional data feeds with the call in accordance with the methods described above. In some embodiments, the data feeds include one or more of a video feed and a text feed. In some embodiments, the electronic computing device may be configured to receive additional information regarding the call (and/or the communication device 105) from a cellular/private data network over which the call is made.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for call queue improvement, the system comprising:
    an electronic computing device including an electronic processor configured to
        receive a call from a communication device operated by a caller,
        analyze the call for an incident factor, wherein the incident factor is indicative of an existing incident and includes at least one selected from the group consisting of a location of a source of the call relative to the existing incident and a time after the existing incident was first reported,
        direct the call, based on the incident factor, to either an automated call handler or to an active call queue,
        when the call is directed to the automated call handler,
            respond to the call with an automated message regarding the existing incident, wherein the automated message is output via the communication device operated by the caller,
            receive, in response to the automated message, an answer from the caller,
            determine whether the call is in regard to the existing incident based on the answer from the caller,
            when the call is not in regard to the existing incident, assign a new incident identifier to a call record of the call and assign the call to the active call queue,
            when the call is in regard to the existing incident, assign an existing incident identifier associated with the existing incident to the call record of the call and assign the call to the active call queue,
        determine whether the call has been abandoned,
        when the call has been abandoned, assign the call record to an abandoned call queue, and display, via a workstation of a call taker, a first list of one or more calls included in the abandoned call queue, wherein the first list includes the call and an indication whether the existing incident identifier has been assigned to the call record, and when the call has not been abandoned, display, via the workstation, a second list of one or more calls included in the active call queue, wherein the second list includes the call and the indication whether the existing incident identifier has been assigned to the call record.

2. The system of claim 1, wherein the electronic processor is further configured to respond to the call with a second automated message regarding a second existing incident when the answer indicates that the call is not in regard to the existing incident;

receive, in response to the second automated message, a second answer from the caller;

assign a second existing incident identifier associated with the second existing incident to the call when the second answer indicates that the call is in regard to the second existing incident.

3. The system of claim 1, wherein the automated message includes a question regarding whether the caller has additional information regarding the existing incident.

4. The system of claim 3, wherein the electronic processor is further configured to assign a priority to the call when the answer from the caller indicates that the caller has additional information regarding the existing incident.

5. The system of claim 1, wherein the automated message is dynamically modified based on information included in an incident record associated with the existing incident.

6. The system of claim 1, wherein the automated message includes a question regarding whether the caller would like to receive a follow up call from a command center.

7. The system of claim 1, wherein the indication whether the existing incident identifier has been assigned to the call record is based on a designation of the call by the electronic processor that indicates at least one of the group consisting of (i) that the call relates to a known incident, (ii) that the call relates to an unknown incident, and (iii) that the electronic processor was unable to determine whether the call relates to a known incident or an unknown incident.

8. The system of claim 7, wherein the electronic processor is further configured to:

determine a priority of calls included in at least one of the group consisting of the first list and the second list based on at least one of the group consisting of the designation of respective calls and an incident type of an incident to which respective calls are related; and display, via the workstation, the calls included in at least one of the group consisting of the first list and the second list based on the priority of the calls.

9. A method for call queue improvement comprising:

receiving, with an electronic processor of an electronic computing device, a call from a communication device operated by a caller;

analyzing, with the electronic processor, the call for an incident factor, wherein the incident factor is indicative of an existing incident and includes at least one selected from the group consisting of a location of a source of the call relative to the existing incident and a time after the existing incident was first reported;

directing, with the electronic processor, the call to an automated call handler based on the incident factor;

responding, with the electronic processor, to the call with an automated message regarding the existing incident based on the incident factor, the automated message being output via the communication device operated by the caller;

receiving, with the electronic processor, an answer from the caller in response to the automated message;

determining, with the electronic processor, that the call is in regard to the existing incident based on the answer from the caller;

assigning, with the electronic processor, an existing incident identifier associated with the existing incident to a call record of the call in response to determining that the call is in regard to the existing incident;

determining, with the electronic processor, that the call has been abandoned;

assigning the call record to an abandoned call queue in response to determining that the call has been abandoned; and displaying, via a workstation of a call taker, a list of one or more calls included in the abandoned call queue, the list including the call and an indication that the existing incident identifier has been assigned to the call record.

10. The method of claim 9 further comprising assigning, with the electronic processor, the call to an active call queue before determining that the call has been abandoned.

11. The method of claim 9, wherein responding to the call with the automated message includes providing, with the electronic processor, a question regarding whether the caller has additional information regarding the existing incident.

12. The method of claim 11, further comprising:

determining, with the electronic processor, that the caller has additional information regarding the existing incident based on the answer from the caller in response to the automated message; and assigning a priority to the call in response to determining that the caller has additional information regarding the existing incident based on the answer.

13. The method of claim 9, wherein responding to the call with the automated message includes dynamically generating, with the electronic processor, the automated message based on information included in an incident record associated with the existing incident.

14. The method of claim 9, wherein responding to the call with the automated message includes providing, with the electronic processor, a question regarding whether the caller would like to receive a follow up call from a command center.

15. The method of claim 9 further comprising:

receiving, with the electronic processor, a second call from a second communication device operated by a second caller;

analyzing, with the electronic processor, the second call for a second incident factor, wherein the second incident factor;

directing, with the electronic processor, the second call to the automated call handler based on the second incident factor;

responding, with the electronic processor, to the second call with a second automated message regarding the existing incident based on the second incident factor, the second automated message being output via the second communication device operated by the second caller;

receiving, with the electronic processor, a second answer from the second caller in response to the second automated message;

determining, with the electronic processor, that the second call is not in regard to the existing incident based on the second answer from the second caller;

assigning, with the electronic processor, a new incident identifier to a second call record of the second call in response to determining that the second call is not in regard to the existing incident; and assigning, with the electronic processor, the second call to an active call queue.

16. The method of claim 15 further comprising:

responding, with the electronic processor, to the second call with a third automated message regarding a second existing incident in response to determining that the second call is not in regard to the existing incident;

receiving, with the electronic processor, a third answer from the second caller in response to the third automated message;

determining, with the electronic processor, that the second call is in regard to the second existing incident based on the third answer from the second caller; and assigning a second existing incident identifier associated with the second existing incident to the second call when the answer indicates that the call is in regard to the second existing incident.

17. The method of claim 9 further comprising determining, with the electronic processor, a respective designation for each of the calls included in the list of the one more calls included in the abandoned call queue, wherein the respective designation indicates at least one of the group consisting of (i) that the call relates to a known incident, (ii) that the call relates to an unknown incident, and (iii) that the electronic processor was unable to determine whether the call relates to a known incident or an unknown incident.

18. The method of claim 17, further comprising determining, with the electronic processor, a priority of calls included the list of the one more calls included in the abandoned call queue based on at least one of the group consisting of the designation of respective calls and an incident type of an incident to which respective calls are related;

wherein displaying the list of the one more calls included in the abandoned call queue includes displaying the list of the one more calls included in the abandoned call queue based on the priority of the calls.

* * * * *